3,355,242
REACTIVE DYES AND METHYLOLATED-4,5-DIHYDROXY-IMIDAZOLIDONE-2, IN COLORING CELLULOSIC TEXTILES
Herman B. Goldstein, Cranston, and Michael A. Silvestri, Providence, R.I., assignors to Sun Chemical Corporation, New York, N.Y., a corporation of Delaware
No Drawing. Filed July 11, 1960, Ser. No. 41,743
15 Claims. (Cl. 8—17)

This invention relates to wash and wear resin-treated dyed or printed cellulose fabrics, i.e., fabrics which are dyed with reactant type dyes and treated with wash and wear resins, which are especially light fast. In addition, the invention relates to processes for making such fabrics.

Recently introduced reactant dyes, i.e., dyes which contain a reactive group such as cyanuric chloride (as described in the American Dyestuff Reporter, 47, No. 2, pp. 3–38, 1958, and 47, No. 11, pp. 377–383, 1958, Journal of the Society of Dyers and Colourists, 73, pp. 237–247, 1957, and British Patent Number 781,930, Aug. 28, 1957) or vinyl sulfon (as described in the American Dyestuff Reporter, 47, No. 24, pp. 895–899, 1958) combine chemically with cellulose and become an integral part of the fiber to yield a dyed fabric possessing excellent brilliance and good fastness to light.

Cyanuric chloride is a very reactive material in which the chlorine atoms can be replaced or hydrolyzed. Replacing one chlorine atom is relatively easy, and such a replacement is used to incorporate cyanuric chloride into the dye molecule. When one of the chlorine atoms in cyanuric chloride is replaced, the remaining two chlorine atoms become less susceptible to either hydrolysis or replacement.

Further, if a second chlorine atom is replaced, the remaining chlorine atom becomes markedly less susceptible to replacement. This is the basis for the cold and hot dyeing colors now available, i.e., the more reactive dichloro compounds are cold dyes while the less reactive monochloro compounds are the hot dyes.

Briefly, the chemistry is as follows:

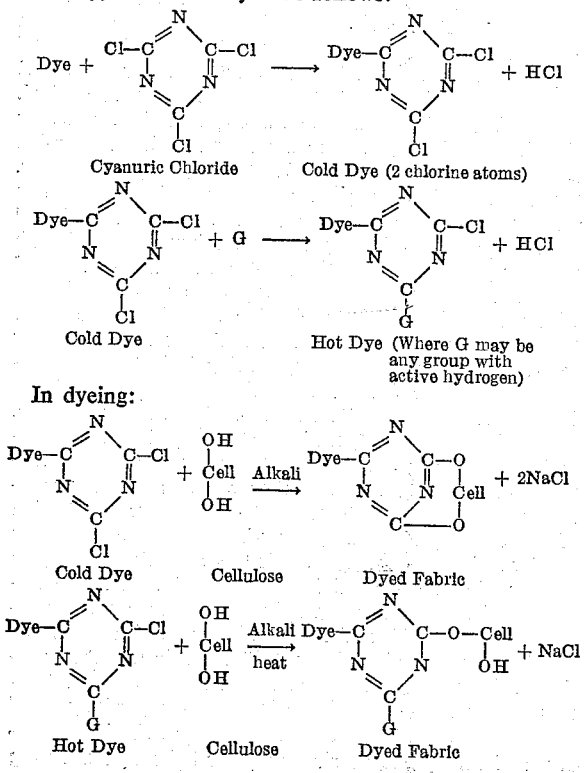

The vinyl sulfon reactive dyes are applied by the same techniques as the cyanuric chloride types, and the generalized reaction is shown below.

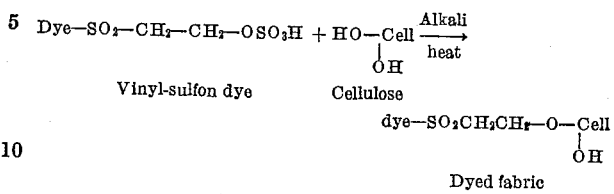

Very frequently such dyed fabrics are also subjected to a resin finishing treatment to improve certain physical characteristics such as crease recovery and dimensional stability. At present, so-called "wash-and-wear" effects are often desired.

However, when most of the presently available resins are applied to reactant dyed goods, the original light fastness of the dyed fabric is largely destroyed. On the other hand, some presently available resins do not harm the light fastness, but they retain an excessive amount of chlorine and, thus, damage the cloth.

The object of this invention is to provide a resin treatment for fabrics which have been dyed or printed with reactant type dyes and which, while affording chlorine resistance, wrinkle resistance, dimensional stability, etc., does not adversely affect the original light fastness of the fabric. Another object of this invention is to provide a process for resin-treating fabric at the same time it is being dyed with a reactant dye. The novelty of this invention is apparent when it is realized that, at present, no resin is available which offers a chlorine resistant "wash-and-wear" finish while at the same time, not affecting the light fastness of reactant dyed cellulosics. As an example, a very commonly used resin is dimethylol cyclic ethylene urea which, though it possesses chlorine resistance when properly applied, has the most destructive effect on the light fastness of reactant dyed cellulosics. As another example, methylated dimethylol urea has little adverse effect on the light fastness of reactant dyed cellulosic fabrics, but this resin is not sufficiently durable to washing to impart the so-called "wash-and-wear" effects, and furthermore, the finish absorbs chlorine when the treated fabric is bleached with a chlorine containing bleach, and this results in severe degradation of the bleached fabric when it is hot pressed.

Dyed or printed cotton fabrics are frequently treated with resin, and then subjected to a mechanical treatment, such as schreinerizing, embossing, or glazing, followed by curing of the resin to provide wash-fast mechanical effects. The resins used in this application are well suited for this type of work.

The term resin, used herein, refers to essentially monomeric resin-forming materials. Specifically, the resins used in this invention are 1,3-dimethylol-4,5-dihydroxy-imidazolidone-2 and 1,3-dimethoxymethyl-4,5-dihydroxy-imidazolidone-2. These are applied as aqueous or alcoholic solutions using acid catalysts including acid-forming materials as curing agents. Textiles are advantageously treated with the resins named above by impregnating the textile with an aqueous or alcoholic solution containing 2 to 20 weight percent and an acid catalyst hereinafter more fully described. The impregnated textile is then passed through squeeze rolls or other device to remove excess solution and provide the desired amount of pick-up. Next, the impregnated textile is dried followed by curing, or, if desired, the drying and curing can be performed at the same time. In any event, the impregnated textile is subjected to curing conditions so that the resin carried thereon is converted to an insoluble material. Curing is advantageously carried out at a temperature in the range of about 200° F., preferably about 280° F., to about 400° F. and usually requires 30 seconds to 600 seconds.

Alternatively, economies can be obtained in process operations by conducting the dyeing and resin-treatment in the same bath or padding solution at the same time. Thus, the reactant dye solution is prepared in the usual manner and added to the resin treating solution, or the resin treating solution is added to the reactant dye solution, or both the reactant dye solution and resin treating solution are made up at once. The concentrations of dye, resin and other ingredients in the final solution are the same as though a separate dye solution or resin solution were being made up. In many instances such ingredients, as textile softeners, surfactants and the like, which operate on the textile to prepare it for dyeing or resin-treatment are common to both the reactant dye solution and the resin treating solution. In those cases where such ingredients are common to both solutions they need not be duplicated in both of said solutions but the use in one solution will function for the purposes of the other.

In spite of the foregoing it must be understood that the concentrations of reactant dye and other ingredients of the final solution are the same as ordinarily used in separately dyeing with reactant dyes. Similarly the concentrations of resin or other ingredients in the final solution are the same as those herein set forth in separately treating with a resin.

In addition to the ingredients necessary for dyeing and resin treating, it is advantageous to add to the combined dyeing and resin treating solution a suitable buffer, e.g., monoammonium phosphate, diammonium phosphate and sodium acetate, to maintain the proper pH and prevent tendering of the textile due to the liberation of hydrogen chloride during the reaction between the reactant dye and the textile. A buffer of this type is not crucial to the operation of the processes herein described and claimed although it is essential for best results.

After impregnating the textile in the combined reactant dye-resin solution to the desired pick-up, the impregnated fabric is dried carefully so as to avoid migration and then subjected to the curing conditions hereinbefore set forth. The textile can then be subjected to after treatments such as washing and the like so as to remove loose materials or not.

The following examples will illustrate our invention (all parts shown are by weight) but it is to be understood that the invention is not to be limited to these examples. All proportions and parts are by weight. Wet pick-up percentages and percentages of components employed in dyeing operations are all based on the weight of fabric being treated.

*Example 1*

160 parts of a 50% solution of 1,3-dimethylol-4,5-dihydroxy-imidazolidone-2 are dissolved in 1000 parts of water and 10 parts of zinc nitrate are added. A cotton fabric, previously dyed with Procion Brilliant Blue H7GS (C.I. Reactive Blue 3) is impregnated with this solution, and then dried and cured for 4 minutes at 320° F. After this treatment, the cloth is free of objectionable odor and is dimensionally stable during laundering. The crease recovery angles are approximately twice those of the untreated fabric, and the finish fabric is chlorine resistant. The light fastness of the dye is unaffected even after 40 hours exposure in the Fade-Ometer and an improvement in the cold water bleeding properties of the dye is noted. As compared to this, a similarly dyed fabric was treated with a solution containing N,N-dimethylol cyclic ethylene urea at the same concentration, and with all other details of the treatment being the same. The fabric treated with the dimethylol cyclic ethylene urea showed noticeable fading even after 20 hours exposure in the Fade-Ometer.

*Example 2*

150 parts of a 50 weight percent solution of 1,3-dimethoxymethyl - 2,5-dihydroxy-imidazolidone-2 prepared, for example, by reacting methanol with 1,3-dimethylol-4,5-dihydroxy-imidazolidone-2 are dissolved in 1000 parts of water, and 10 parts of maleic acid are added.

White cotton broadcloth is immersed in this solution, the excess liquid removed by passing through squeeze rolls to give a wet pick-up of approximately 65%. The impregnated fabric was dried 2 minutes at 250° F., then cured 2 minutes at 330° F. The resulting treated fabric was essentially free of objectionable odor and the whiteness of the fabric was unimpaired by the treatment. The fabric showed approximately 260 degrees crease recovery (total of warp plus filling), and after washing with soap and sodium hypochlorite bleach, and hanging, the fabric dried with a smooth appearance and suffered no loss in strength even when pressed with a hot iron; thus, demonstrating the properties known as "wash-and-wear" and chlorine resistance.

Another experiment was performed using the same treatment as above but instead of treating white cotton, a piece of viscose rayon which had been previously dyed with Procion Brilliant Red 5BS (C.I. Reactive Red 2), was treated in the same manner. The resulting treated fabric showed reduced shrinkage, improved crease recovery and smooth drying properties. In addition, the dye present on the treated fabric showed only an insignificant amount of fading when the fabric was exposed for 40 hours in the Fade-Ometer. In place of the maleic acid used in the above treatments, other acid substances may be used as the catalyst; for example, zinc nitrate, zirconium oxychloride, etc.

As compared to the results cited above, another piece of the fabric dyed with Procion Brilliant Red 5BS was treated in the same way but replacing the 1,3-dimethoxymethyl-4,5-dihydroxy-imidazolidone-2 with equal weight of 1,3-dimethylol-2-keto-5-ethyl-s-triazone. The triazone-treated fabric showed noticeable fading even after 20 hours exposure in the Fade-Ometer.

*Example 3*

An 80 x 80 cotton print cloth was dyed with Remazol Yellow RT according to the following: the fabric was padded at 100° F. with 75 weight percent wet pick-up in a pad bath containing 1.5 oz./gal. Remazol Yellow RT a yellow vinylsulfone dye, 0.25 oz./gal. Synthrapol N (non-ionic ethylene oxide condensate), and 1.50 oz./gal. Glauber's Salt. The fabric was dried at 180° F. and then chemical padded through an aqueous solution containing 1.5 oz./gal. caustic flakes and 39.0 oz./gal. common salt. It was steamed 30 seconds, rinsed, soaped at 200° F. in 0.13 oz./gal. Synthrapol SP for 5 minutes, rinsed and dried. The dyed fabric was then discharge printed with a flower pattern. Part of the print pattern was discharged to white, and part of the print pattern was illuminated with color using Ahcovat Printing Pink FF Paste (Part I, New Color Index—Vat Red 1 and Part II, New Color Index—73360) and Ahcovat Printing Jade Green B Extra Double Paste (Part I, New Color Index—Vat Green 1 and Part II, New Color Index—59825). After printing, the fabric was steamed, oxidized and soaped off thoroughly in accordance with standard discharge printing practice. The printed fabric was then passed through a solution containing 15 parts of a 50 weight percent solution of 1,3-dimethylol-4,5-dihydroxy-imidazolidone-2, 1 part of glycerol mono stearate (added as a lubricant), 1 part of zinc nitrate dissolved in 83 parts of water. The impregnated fabric was passed through squeeze rolls to remove excess liquid, and to provide a wet pick-up of approximately 60 weight percent. The fabric was then partially dried on a clip frame at 220° F. so as to leave 10% moisture in the fabric. Following this, the partially dried fabric was immediately passed through a Schreiner calender, and finally the fabric was passed through a curing chamber where it remained for 2.5 minutes at 320° F. The resulting treated cloth had the deep-seated luster character of the Schreiner effect, and this property persisted even after many launderings. In addition, the white portion of the print was unaffected by the resin treatment, and the quality of the white was unimpaired by bleaching with a chlorine-containing bleach, followed by pressing. Also, the fabric showed good dimensional stability toward laundering, and the fabric had excellent crease recovery and smooth drying properties. When exposed to the Fade-Ometer, there was no more than an insignificant fading even after 40 hours exposure. As compared to this, the same dyed and printed fabric was passed through a solution containing 15 parts of a 50 weight percent solution of bis-(methoxymethyl)urea. All other materials in the solution were the same as those described above, and the treating procedure was identical to that described above. When the resulting treated fabric was checked for light fastness, it was found that it had essentially the same light fastness properties as those obtained with the treatment using 1,3-dimethylol-4,5-dihydroxy-imidazolidone-2. However, as the bis(methoxymethyl)-urea treatment was subjected to multiple launderings, the luster due to the Schreiner pattern diminished greatly and practically disappeared after 5 launderings. Similarly, the initial high crease recovery of the treated fabric was rapidly lost on multiple launderings, and although the smooth drying property was satisfactory after the first laundering, the fabric showed very poor smooth drying properties after 5 or 10 launderings. Furthermore, when the bis(methoxymethyl)-urea treatment was laundered in the presence of chlorine-containing bleach, and the laundered fabric was pressed with a hot iron, the fabric became badly discolored, the white portions of the print turned brown, and the tensile strength of the fabric was reduced about 80 to 90%.

*Example 4*

A bath containing 2 percent of Procion Brilliant Blue H7GS, 15% of a 50% solution of 1,3-dimethylol-4,5-dihydroxy-imidazolidone-2, 0.5% of mono-ammonium phosphate and 1% of Synthrapol N was made up in water. White cotton broadcloth was impregnated by immersing it in the bath to provide an 80% wet pick-up. The impregnated fabric was dried carefully under conditions minimizing migration. Following this, the fabric was baked for approximately 3 minutes at about 150° C. in the customary manner of curing resin-treated fabrics. The cured resin-treated, dyed fabric is then after-washed in the customary manner for after-washing resin-treated fabrics.

The fabric thus dyed and treated is equivalent in shade, light fastness, tear strength, tensile strength, crease resistance, general wash and wear properties and other physical properties as the sequentially dyed and resin-treated fabric of Example 1.

Although it is expected that mixtures would give the same results as the resins used separately, we contemplate that mixtures of 1,3-dimethylol-4,5-dihydroxy-imidazolidone-2 and 1,3-dimethoxymethyl-4,5-dihydroxy-imidazolidone-2 may be used in the practice of this invention. More normally, however, either one or the other of these materials would be used separately.

In addition to the resin, it is necessary to have present an appropriate acid catalyst which includes acidic and acid-forming substances to accelerate the curing of these resins and/or promoting the reacting of the resin with the cellulose. Typical acid catalysts are metal salts (such as zinc nitrate, zirconium oxychloride, etc.), organic acids (such as maleic acid, oxalic acid, lactic acid, etc.), amine hydrochlorides (such as the hydrochloride of 2-amino-2-methyl-1-propanol, etc.) and other compounds which release an acidic material at high temperatures. It is interesting to note that when the dyestuffs and the resin are being applied simultaneously, the hydrochloric acid liberated from the dyestuff may act as the catalyst for fixing the resin. When using this type of technique it is merely necessary to add a suitable buffer to allow the acid to act on the resin, but while preventing the acid from degrading the cloth.

In addition to the resin and the catalyst, other materials may be added to the treatment such as lubricants, softeners, firming agents, water repellents, mildew inhibitors, etc. The only precaution that need be taken in the use of such other additives is that they be selected with caution so as to be sure that such additives do not interfere with the proper functioning of the acid catalyst nor that such additives contribute to chlorine retention or to adversely effect the light fastness of dyes.

The resins used in the invention are particularly effective to produce the desired results when applied to cellulosic fabrics such as cotton, viscose rayon, cupra-ammonium rayon and other forms of regenerated cellulose. However, very useful effects have been obtained, also, by the use of these resins on blends of such cellulosic fibers with other non-cellulosic fibers such as nylon, Orlon, cellulose acetate, dynel, etc., and the term "cellulosic goods" in the claims is intended to embrace not only cotton and regenerated cellulose but also blends of these fibers with other non-cellulosic fibers.

What is claimed is:
1. The method of dyeing textiles to color them and impart wash and wear characteristics thereto, comprising dyeing said textile with a reactant dye having at least one reactive group from the class consisting of

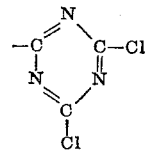

and $SO_2-CH_2-CH_2-OSO_3H$ and impregnating said textile with a solution of between 2 and 20 weight percent of a compound from the class consisting of 1,3-dimethylol-4,5-dihydroxy-imidazolidone-2 and 1,3-dimethoxymethyl-4,5-dihydroxy-imidazolidone-2 in the presence of an acid catalyst and then drying and curing the resulting dyed, impregnated textile at temperatures between 200° F. and 400° F. for a period from 30 seconds to 600 seconds.

2. The method of treating textiles to color them and impart wash and wear characteristics thereto, comprising treating said textile with a solution containing dyeing concentrations of a reactant dye having at least one reactive group from the class consisting of

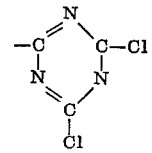

and $SO_2-CH_2-CH_2-OSO_3H$, a compound from the class consisting of 1,3-dimethylol-4,5-dihydroxy-imidazolidone-2 and 1,3-dimethoxymethyl-4,5-dihydroxy-imidazolidone-2, and an acid catalyst while maintaining the pH at a value which prevents weakening of said textile and then drying and curing the thus treated textile.

3. The textile dyed and treated by the process of claim 2.

4. The method of treating cellulosic textiles colored with dyes containing reactive groups selected from the class consisting of

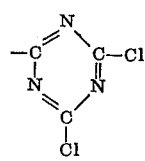

and $SO_2-CH_2-CH_2-OSO_3H$ which are chemically reactive with cellulose to obtain improved properties, which comprises impregnating the textile with a solution of between 2 and 20 weight percent of a compound from the class consisting of 1,3-dimethylol-4,5-dihydroxy-imidazolidone-2 and 1,3-dimethoxymethyl-4,5-dihydroxy-imidazolidone-2, in the presence of an acid catalyst and then drying and curing the impregnated textile at temperatures between 200° F. and 400° F. for a period from 30 seconds to 600 seconds.

5. The method of treating cellulosic textiles colored with dyes containing reactive groups selected from the class consisting of

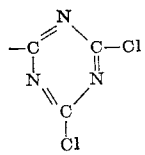

and $SO_2$—$CH_2$—$CH_2$—$OSO_3H$ which are chemically reactive with cellulose, which comprises impregnating the textile with a solution of between 2 and 20 weight percent of a compound selected from the class consisting of 1,3-dimethylol-4,5-dihydroxy-imidazolidone-2 and 1,3-dimethoxymethyl-4,5-dihydroxy-imidazolidone-2, in the presence of an acid catalyst, partially drying said impregnated goods, passing the partially dried textile through a heated engraved calendar so as to alter the surface texture and appearance of said textile, and then to cure the textile at a temperature between 280° to 400° F. to insolubilize the compound.

6. Textile treated by the process claimed in claim 1.
7. Textile treated by the process claimed in claim 4.
8. Textile treated by the process claimed in claim 5.
9. The method of treating textiles to color them and impart wash and wear characteristics thereto, comprising dyeing said textiles with a reactant dye having the cyanuric chloride group as a reactive group, thereafter impregnating said textiles with a solution containing a compound from the class consisting of 1,3-dimethylol-4,5-dihydroxy-imidazolidone-2 and 1,3-dimethoxymethyl-4,5-dihydroxy-imidazolidone-2, and an acid catalyst while maintaining the pH at a value which avoids substantial weakening of said textiles and then drying and curing the thus treated textiles.

10. The method of treating textiles to color them and impart wash and wear characteristics thereto, comprising treating said textiles with a solution containing dyeing concentrations of a reactant dye having the cyanuric chloride group as a reactive group, a compound from the class consisting of 1,3-dimethylol-4,5-dihydroxy-imidazolidone-2 and 1,3-dimethoxymethyl-4,5-dihydroxy-imidazolidone-2, and an acid catalyst while maintaining the pH at a value which avoids substantial weakening of said textiles and then drying and curing the thus created textiles.

11. The method of treating textiles to color them and impart wash and wear characteristics thereto, comprising dyeing said textiles with a reactant dye having a vinyl sulfon group as a reactive group, thereafter impregnating said textiles with a solution containing a compound from the class consisting of 1,3-dimethylol-4,5-dihydroxy-imidazolidone-2 and 1,3-dimethoxymethyl-4,5-dihydroxy-imidazolidone-2, and an acid catalyst while maintaining the pH at a value which avoids substantial weakening of said textiles and then drying and curing the thus treated textiles.

12. The method of treating textiles to color them and impart wash and wear characteristics thereto, comprising treating said textiles with a solution containing dyeing concentrations of a reactant dye having the vinyl sulfon group as a reactive group, a compound from the class consisting of 1,3-dimethylol-4,5-dihydroxy-imidazolidone-2 and 1,3-dimethoxymethyl-4,5-dihydroxy-imidazolidone-2, and an acid catalyst while maintaining the pH at a value which avoids substantial weakening of said textiles and then drying and curing the thus treated textiles.

13. Textile treated by the process claimd in claim 9.
14. Textile treated by the process claimed in claim 10.
15. Textile treated by the process claimed in claim 11.

References Cited

UNITED STATES PATENTS 2,731,364  1/1956  Reibnitz.
2,880,052  3/1959  Conciatori _____ 8—116.3

OTHER REFERENCES

Schlaeppi, Amer. Dyestuff Reporter, June 1958, pages 377–383.

I.C.I. Belgian Patent No. 573,126; 1959. This patent was published in the second half of May 1959.

Proc. of Amer. Assoc. Tex. Chem. and Colorists, Jan. 4, 1954, pp. P6–P13.

Smith, pp. 482–488, The Textile Manufacturer, September 1955.

Sommer, Amer. Dyestuff Rep., pp. 895–899, Dec. 15, 1958.

NORMAN G. TORCHIN, *Primary Examiner.*

MORRIS O. WOLK, ABRAHAM H. WINKELSTERN, *Examiners.*

D. LEVY, *Assistant Examiner.*